US012492362B2

(12) United States Patent
Schuemann et al.

(10) Patent No.: US 12,492,362 B2
(45) Date of Patent: Dec. 9, 2025

(54) CLEANING AGENT SHAPED BODY

(71) Applicant: Henkel AG & Co. KGaA, Duesseldorf (DE)

(72) Inventors: Sabine Schuemann, Neuss (DE); Thomas Holderbaum, Hilden (DE); Daniel Menham, Duesseldorf (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 716 days.

(21) Appl. No.: 17/590,576

(22) Filed: Feb. 1, 2022

(65) Prior Publication Data

US 2022/0251484 A1 Aug. 11, 2022

Related U.S. Application Data

(63) Continuation of application No. PCT/EP2020/071089, filed on Jul. 27, 2020.

(30) Foreign Application Priority Data

Aug. 1, 2019 (DE) ......................... 102019211566.7

(51) Int. Cl.

| | |
|---|---|
| ***C11D 1/00*** | (2006.01) |
| ***A61L 2/23*** | (2006.01) |
| ***A61L 9/05*** | (2006.01) |
| ***B08B 3/04*** | (2006.01) |
| ***C11D 17/00*** | (2006.01) |
| ***E03D 9/03*** | (2006.01) |
| *E03D 9/02* | (2006.01) |

(52) U.S. Cl.

CPC .......... *C11D 17/0056* (2013.01); *E03D 9/038* (2013.01); *C11D 2111/14* (2024.01); *E03D 2009/024* (2013.01)

(58) Field of Classification Search

CPC ... C11D 1/00; C11D 11/0023; C11D 17/0056; B08B 3/04; A61L 2/23; A61L 9/05; E03D 9/002; E03D 9/005; E03D 9/038

See application file for complete search history.

(56) References Cited

U.S. PATENT DOCUMENTS

| | | | | |
|---|---|---|---|---|
| 4,460,490 | A * | 7/1984 | Barford .............. | C11D 17/0082 252/186.25 |
| 2008/0092282 | A1 * | 4/2008 | Altmann .................. | E03D 9/00 4/231 |
| 2013/0239313 | A1 * | 9/2013 | Schiedel ................ | E03D 9/005 510/192 |

FOREIGN PATENT DOCUMENTS

| | | | |
|---|---|---|---|
| DE | 10064635 | A1 | 7/2002 |
| DE | 102009003088 | A1 | 11/2010 |
| DE | 60101482 | T3 | 6/2011 |

(Continued)

OTHER PUBLICATIONS

German Search Report DE 10 2019 211 566.7 Completed: Mar. 10, 2020; Mailing Date: Mar. 10, 2020 pp. 7.

(Continued)

*Primary Examiner* — Brian P Mruk

(74) *Attorney, Agent, or Firm* — Blank Rome LLP

(57) ABSTRACT

Cleaning agent shaped bodies having a bearing surface and a dome surface adjoining the bearing surface, the ratio of the maximum diameter of the bearing surface to the maximum diameter of a cross-sectional area of the dome surface parallel to the bearing surface being 1:20 to 4:5. The invention also relates to the use of these bodies and to a method using these cleaning agent shaped bodies.

18 Claims, 3 Drawing Sheets

(56) References Cited

FOREIGN PATENT DOCUMENTS

| | | | |
|---|---|---|---|
| DE | 102010043848 | A1 | 5/2012 |
| EP | 0055100 | A1 | 6/1982 |

OTHER PUBLICATIONS

PCT International Search Report PCT/EP2020/071089 Completed: Oct. 9, 2020; Mailing Date: Oct. 19, 2020 pp. 4.

* cited by examiner

CLEANING AGENT SHAPED BODY

FIELD OF THE INVENTION

The present invention describes a cleaning agent shaped body, the use thereof, and methods using such a shaped body.

BACKGROUND OF THE INVENTION

WC cleaning agents are available to the consumer in a large number of different product formats. In addition to liquid cleaning agents, WC cleaning pieces or WC rim blocks are particularly popular. These agents, which are used for cleaning, disinfecting and scenting toilets, are used, for example, below the rim of the toilet (so-called rim blocks) or in the toilet's water tank or cistern (so-called in-tank blocks or cistern blocks).

Manufacturers and consumers place a number of different requirements on these WC cleaning agents, with producibility, storability and transportability being of particular importance.

In addition to product aesthetics, one of the most important product criteria for consumers is the product lifespan, which in the case of WC cleaning pieces is determined by their dissolution and rinsing behavior. In order to avoid frequent re-dosing of the WC cleaning piece in the toilet or its cistern, these cleaning pieces should be rinsed evenly and for a long time and should not be flushed away by the incoming water, but remain reliably in the toilet or cistern.

Aesthetically pleasing spherical WC cleaning pieces with good rinsing behavior for use below the rim of a toilet are disclosed in German patent application DE 10 2009 003 088 A1.

In European patent application EP 055 100 A1, multiphase WC cleaning blocks of various geometrical shapes for use in the cistern of the toilet are described.

BRIEF SUMMARY OF THE INVENTION

Against this technical background, the object was to provide, for use in a toilet cistern, a cleaning agent shaped body which, in addition to an aesthetically pleasing shape, is characterized by easy producibility, storability and transportability. In addition, the shaped body should be superior to conventional agents with regard to its rinsing behavior, and should remain reliably in the toilet cistern even with different flow conditions in different types of cistern and ensure the uniform release of active substances in the water reservoir of the toilet cistern.

This object was achieved by a cleaning agent shaped body having a specific geometry.

A first claimed subject is a cleaning agent shaped body comprising a bearing surface and a dome surface adjoining the bearing surface, the ratio of the maximum diameter of the bearing surface to the maximum diameter of a cross-sectional area of the dome surface parallel to the bearing surface being 1:20 to 4:5.

The shaped bodies are preferably dimensionally stable. "Dimensionally stable," as used herein, refers to the property of the shaped bodies of maintaining their three-dimensional shape under the conditions that are common in storage and transportation, i.e., that of neither disintegrating nor being irreversibly deformed in the temperature ranges that are common in storage and transportation and under the action of the forces that are common in storage and transportation.

The cleaning agent shaped body comprises a bearing surface and a dome surface. The bearing surface and the dome surface are adjacent to one another and are separated from one another by an edge. A surface on which the shaped body can rest is referred to as a bearing surface. For this purpose, the bearing surface comprises at least three bearing points. The diameter of the bearing surface corresponds to the maximum distance between two bearing points associated therewith.

The contact surface of the cleaning agent shaped body must be distinguished from the bearing surface. The contact surface corresponds to the surface by means of which a cleaning agent shaped body, the bearing surface of which rests on a flat surface, is in contact with this surface. In the case of a planar bearing surface, the contact surface is identical to said bearing surface.

If the cleaning agent shaped body is introduced into the cistern of a toilet, it will change its spatial orientation due to the usual flow conditions in the toilet cistern until its bearing surface rests on the base of the cistern. Due to the improved adhesion—associated with this spatial orientation—of the shaped body to the cistern base, the movement of the cleaning agent shaped body in the water reservoir is minimized or completely prevented. In this way, uniform rinsing behavior is achieved and at the same time the cleaning agent shaped body is prevented from being flushed out of the cistern.

In a preferred embodiment, the bearing surface of the cleaning agent shaped body is planar. By means of a bearing surface having a planar or flat design, the bearing and adhesive behavior of the shaped body on the cistern base can generally be improved. If the bearing surface is planar, assuming a planar cistern base, the bearing surface is identical to the contact surface of the cleaning agent shaped body with the cistern base if the cleaning agent shaped body is appropriately oriented in the water reservoir. Preferred planar bearing surfaces are circular.

A particularly preferred cleaning agent shaped body comprises a planar, circular bearing surface and a dome surface adjoining this bearing surface, the ratio of the maximum diameter of the bearing surface to the maximum diameter of a cross-sectional area of the dome surface parallel to the bearing surface being 1:20 to 4:5.

The bearing surface described above can be modified in different ways. In a first modification, the bearing surface of the cleaning agent shaped body can have imprints. These imprints can be geometric patterns, pictorial forms, warning notices, letters, names, numbers or brand names, for example. For better identification, the imprints and the surrounding bearing surface can have different colors. For example, the imprints can be colored.

For a given bearing surface, the imprints reduce the contact surface between the cleaning agent shaped body and the cistern base. In other words, the bearing surface is larger than the contact surface of the cleaning agent shaped body with the cistern base. The imprints can extend to the edge of the bearing surface. In such an embodiment, the planar course of the edge of the bearing surface is interrupted. Such shaped bodies tend, when in use, to wash away from the side of the bearing surface in the region of the imprints reaching to the edge of the bearing surface and thus tend to have irregular and less predictable rinsing behavior. In a preferred embodiment, the imprints are therefore completely surrounded by the bearing surface; in other words, they do not extend to the edge of the bearing surface.

Preferred cleaning agent shaped bodies, comprising a planar bearing surface and a dome surface adjoining the bearing surface, the ratio of the maximum diameter of the bearing surface to the maximum diameter of a cross-sectional area of the dome surface parallel to the bearing surface being 1:20 to 4:5, and the bearing surface having imprints which do not extend to the edge of the bearing surface.

In an alternative embodiment, the bearing surface has planar and concave portions. In this embodiment, not all of the bearing surface is concavely curved. Instead, subregions or portions of the bearing surface are concavely curved while other portions or subregions are planar. An example of such a surface structure is two, three, four or more randomly or regularly arranged concave depressions in the region of the bearing surface.

If the concave portions extend to the edge of the bearing surface, the planar course of the edge of the bearing surface is interrupted. The edge between the bearing surface and the dome surface extends in a wave-shaped manner in shaped bodies of this type. Cleaning agent shaped bodies in which the edge between the bearing surface and the dome surface is wave-shaped are preferred from an aesthetic point of view.

As already described in the case of the cleaning agent shaped bodies having imprints, however, these shaped bodies also tend to wash away from the side of the bearing surface in the region of the concave depressions reaching to the edge of the bearing surface and thus tend to have irregular and less predictable rinsing behavior. In a preferred embodiment, the concave portions are therefore completely surrounded by the bearing surface; in other words, they do not extend to the edge of the bearing surface.

Cleaning agent shaped bodies in which the edge between the bearing surface and the dome surface is planar have proven to be advantageous with regard to the adhesion of the shaped body to the cistern base, the rinsing behavior and the retention of the cleaning agent shaped body in the cistern.

In a continuation of the embodiment described above, the bearing surface is completely concave. In other words, the contact surface between the cleaning agent shaped body and the base is formed solely by the edge region of the bearing surface, which surrounds the concave bulge of the bearing surface.

In the case of a bearing surface oriented spatially downward, the dome surface adjoins the bearing surface from above. The dome surface can be designed in different ways, provided that the ratio of the maximum diameter of the bearing surface to the maximum diameter of a cross-sectional area of the dome surface parallel to the bearing surface of 1:20 to 4:5 is maintained, which ratio characterizes the cleaning agent shaped body.

Cleaning agent shaped bodies in which cleaning agent shaped bodies have a ratio of the maximum diameter of the bearing surface to the maximum diameter of a cross-sectional area of the dome surface parallel to the bearing surface of 1:15 to 2:3, preferably 1:10 to 1:2, have proven to be particularly advantageous with regard to the adhesion of the shaped body to the cistern base, the rinsing behavior and the retention of the cleaning agent shaped body in the cistern.

In a first embodiment, the dome surface is convex polyhedral. In addition to the bearing surface, such a cleaning agent shaped body has a large number of additional interfaces. In the case of a convex polyhedral dome surface, the bearing surface is larger than each of the additional interfaces in the region of the dome surface. The ratio of the area of the bearing surface to the area of the largest additional interface of the convex polyhedral dome is preferably at least 2:1, more preferably 2:1 to 80:1 and in particular 4:1 to 60:1.

A further subject of the application is a cleaning agent shaped body comprising a bearing surface and a convex polyhedral dome surface adjoining the bearing surface, the ratio of the maximum diameter of the bearing surface to the maximum diameter of a cross-sectional area of the dome surface parallel to the bearing surface being 1:20 to 4:5 and ratio of the area of the bearing surface to the area of the largest additional interface of the convex polyhedral dome being at least 2:1, preferably 2:1 to 80:1 and in particular 4:1 to 60:1.

It has proven to be advantageous for the spatial orientation of the shaped body in the cistern and the rinsing behavior of the shaped body to at least partially round off the dome surface.

It has also proven to be advantageous for the spatial orientation of the shaped body in the cistern and the predictability of the rinsing behavior of the shaped body if the shaped body has an axis of symmetry orthogonally to the bearing surface.

Cleaning agent shaped bodies which have, in parallel with the bearing surface, a circular or ellipsoidal cross-sectional area, preferably a circular cross-sectional area, are particularly preferred. In the same way, cleaning agent shaped bodies are preferred which have, orthogonally to the bearing surface, a cross section in the form of an arc of a circle or an arc of an ellipse, preferably in the form of an arc of a circle.

Rounded, for example spherical or ellipsoidal, dome surfaces have advantages over the convex polyhedral dome surfaces described above in terms of their rinsing behavior, in particular with regard to the uniform and long-lasting rinsing behavior and the predictability thereof in toilet cisterns of different designs and with different flow conditions.

The cleaning agent shaped bodies having a convex polyhedral dome surface are in turn superior to the hexahedral cleaning agent shaped bodies with regard to their rinsing behavior and the predictability thereof.

In summary, particularly preferred cleaning agent shaped bodies are those which comprise a planar, circular bearing surface and a dome surface adjoining the bearing surface,

- the ratio of the maximum diameter of the bearing surface to the maximum diameter of a cross-sectional area of the dome surface parallel to the bearing surface being 1:20 to 4:5;
- the shaped body having, in parallel with the bearing surface, a circular cross-sectional area; and
- the shaped body having, orthogonally to the bearing surface, a cross section in the form of an arc of a circle.

In other words, cleaning agent shaped bodies are particularly preferred which are in the form of a spherical segment, the ratio of the maximum diameter of the base area to the maximum diameter of a cross-sectional area of the dome parallel to the base area being 1:20 to 4:5.

As already described in connection with the bearing surface, the cleaning agent shaped body can also have imprints in the region of the dome surface. These imprints can also be geometric patterns, pictorial forms, warning notices, letters, names, numbers or brand names. For better identification, the imprints and the surrounding bearing surface can have different colors. For example, the imprints can be colored.

The cleaning agent shaped bodies described above develop their advantageous technical properties in particular when they are introduced into the cistern of a toilet. The use of the cleaning agent shaped bodies disclosed in this description for cleaning or scenting the water in a toilet cistern is therefore a further subject of this application.

In particular, uses in which the shaped body remains in the toilet cistern for at least 40, preferably at least 80 and in particular at least 200, flushing cycles are preferred.

The specific technical features disclosed above and below in connection with the cleaning agent shaped body also apply, mutatis mutandis, to the use thereof. To avoid repetition, reference is made at this point to the statements made there.

As stated above, the shaped bodies are preferably suitable for remaining in the toilet cistern for at least 40, preferably at least 80 and in particular at least 200, flushing cycles.

Against the background of the intended service life for the cleaning agent shaped bodies, said bodies preferably have a weight of 10 to 160 g, preferably 15 to 120 g and in particular 20 to 90 g.

The density of the cleaning agent shaped bodies is preferably 1.2 to 2.0 g/cm$^3$, particularly preferably 1.4 to 1.9 g/cm$^3$ and in particular 1.5 to 1.8 g/cm$^3$. These density ranges, in combination with the specific three-dimensional shape of the shaped bodies, have proven to be particularly advantageous with regard to orientation and retention in the cistern. For the same reasons, the bearing surface of the cleaning agent shaped bodies preferably has a maximum diameter of 3 to 20 mm, preferably 4 to 18 mm and in particular 5 to 15 mm.

The volume of the cleaning agent shaped bodies is preferably in the range of 8 to 100 ml, preferably 12 to 80 ml and in particular 15 to 60 ml.

Preferred cleaning agent shaped bodies have a bearing surface and a dome surface adjoining the bearing surface, the ratio of the maximum diameter of the bearing surface to the maximum diameter of a cross-sectional area of the dome surface parallel to the bearing surface being 1:20 to 4:5;

the cleaning agent shaped body having a weight of 20 to 90 g; and the density of the cleaning agent shaped body being 1.5 to 1.8 g/cm$^3$.

The cleaning agent shaped bodies can be single-phase or multiphase. Single-phase shaped bodies are preferred because they are easier to produce.

In addition to a water-dispersible carrier material, the cleaning agent shaped bodies preferably contain one or more active substances as essential constituents. It is particularly preferred if the cleaning agent shaped body comprises:

a) 20 to 90 wt. % water-dispersible carrier material; and b) 10 to 80 wt. % active substances.

Surfactants, fragrances and dyes are preferably used as active substances. An active substance combination comprising surfactant, fragrance and dye is very particularly preferred.

The features of some preferred cleaning agent shaped bodies can be found in the following tables (amounts for the carrier material and the active substances given in wt. % based on the total weight of the agent, unless otherwise indicated).

| | Body 1 | Body 2 | Body 3 | Body 4 | Body 5 |
|---|---|---|---|---|---|
| Ratio * | 1:20 to 4:5 | 1:20 to 4:5 | 1:15 to 2:3 | 1:15 to 2:3 | 1:10 to 1:2 |
| Weight (g) | 10 to 160 | 15 to 120 | 15 to 120 | 15 to 120 | 20 to 90 |
| Diameter (mm) ** | 3 to 20 | 4 to 18 | 4 to 18 | 5 to 15 | 5 to 15 |

| | Body 6 | Body 7 | Body 8 | Body 9 | Body 10 |
|---|---|---|---|---|---|
| Ratio * | 1:20 to 4:5 | 1:20 to 4:5 | 1:15 to 2:3 | 1:15 to 2:3 | 1:10 to 1:2 |
| Weight (g) | 10 to 160 | 15 to 120 | 15 to 120 | 15 to 120 | 20 to 90 |
| Density (g/cm$^3$) | 1.2 to 2.0 | 1.4 to 1.9 | 1.4 to 1.9 | 1.5 to 1.8 | 1.5 to 1.8 |

| | Body 11 | Body 12 | Body 13 | Body 14 | Body 15 |
|---|---|---|---|---|---|
| Ratio * | 1:20 to 4:5 | 1:20 to 4:5 | 1:15 to 2:3 | 1:15 to 2:3 | 1:10 to 1:2 |
| Weight (g) | 10 to 160 | 15 to 120 | 15 to 120 | 15 to 120 | 20 to 90 |
| Diameter (mm) ** | 3 to 20 | 4 to 18 | 4 to 18 | 5 to 15 | 5 to 15 |
| Bearing surface | | | circular, planar | | |

| | Body 16 | Body 17 | Body 18 | Body 19 | Body 20 |
|---|---|---|---|---|---|
| Ratio * | 1:20 to 4:5 | 1:20 to 4:5 | 1:15 to 2:3 | 1:15 to 2:3 | 1:10 to 1:2 |
| Weight (g) | 10 to 160 | 15 to 120 | 15 to 120 | 15 to 120 | 20 to 90 |
| Density (g/cm$^3$) | 1.2 to 2.0 | 1.4 to 1.9 | 1.4 to 1.9 | 1.5 to 1.8 | 1.5 to 1.8 |
| Bearing surface | | | circular, planar | | |

| | Body 21 | Body 22 | Body 23 | Body 24 | Body 25 |
|---|---|---|---|---|---|
| Ratio * | 1:20 to 4:5 | 1:20 to 4:5 | 1:15 to 2:3 | 1:15 to 2:3 | 1:10 to 1:2 |
| Weight (g) | 10 to 160 | 15 to 120 | 15 to 120 | 15 to 120 | 20 to 90 |
| Density (g/cm$^3$) | 1.2 to 2.0 | 1.4 to 1.9 | 1.4 to 1.9 | 1.5 to 1.8 | 1.5 to 1.8 |
| Bearing surface | | | circular, planar | | |
| Cross-sectional area *** | | | circular | | |

| | Body 26 | Body 27 | Body 28 | Body 29 | Body 30 |
|---|---|---|---|---|---|
| Ratio * | 1:20 to 4:5 | 1:20 to 4:5 | 1:15 to 2:3 | 1:15 to 2:3 | 1:10 to 1:2 |
| Weight (g) | 10 to 160 | 15 to 120 | 15 to 120 | 15 to 120 | 20 to 90 |
| Diameter (mm) ** | 3 to 20 | 4 to 18 | 4 to 18 | 5 to 15 | 5 to 15 |
| Bearing surface | | | circular, planar | | |
| Cross-sectional area *** | | | circular | | |

| | Body 31 | Body 32 | Body 33 | Body 34 | Body 35 |
|---|---|---|---|---|---|
| Ratio * | 1:20 to 4:5 | 1:20 to 4:5 | 1:15 to 2:3 | 1:15 to 2:3 | 1:10 to 1:2 |
| Weight (g) | 10 to 160 | 15 to 120 | 15 to 120 | 15 to 120 | 20 to 90 |
| Density (g/cm$^3$) | 1.2 to 2.0 | 1.4 to 1.9 | 1.4 to 1.9 | 1.5 to 1.8 | 1.5 to 1.8 |
| Bearing surface | | | circular, planar | | |
| Cross-sectional area *** | | | circular | | |
| Cross-sectional area **** | | | arc of a circle | | |

| | Body 36 | Body 37 | Body 38 | Body 39 | Body 40 |
|---|---|---|---|---|---|
| Ratio * | 1:20 to 4:5 | 1:20 to 4:5 | 1:15 to 2:3 | 1:15 to 2:3 | 1:10 to 1:2 |
| Weight (g) | 10 to 160 | 15 to 120 | 15 to 120 | 15 to 120 | 20 to 90 |
| Diameter (mm) ** | 3 to 20 | 4 to 18 | 4 to 18 | 5 to 15 | 5 to 15 |
| Bearing surface | | | circular, planar | | |
| Cross-sectional area *** | | | circular | | |
| Cross-sectional area **** | | | arc of a circle | | |

| | Body 41 | Body 42 | Body 43 | Body 44 | Body 45 |
|---|---|---|---|---|---|
| Ratio * | 1:20 to 4:5 | 1:20 to 4:5 | 1:15 to 2:3 | 1:15 to 2:3 | 1:10 to 1:2 |
| Weight (g) | 10 to 160 | 15 to 120 | 15 to 120 | 15 to 120 | 20 to 90 |
| Diameter (mm) ** | 3 to 20 | 4 to 18 | 4 to 18 | 5 to 15 | 5 to 15 |
| Water-dispersible carrier material | | | 20 to 90 | | |
| Active substances | | | 10 to 80 | | |

| | Body 46 | Body 47 | Body 48 | Body 49 | Body 50 |
|---|---|---|---|---|---|
| Ratio * | 1:20 to 4:5 | 1:20 to 4:5 | 1:15 to 2:3 | 1:15 to 2:3 | 1:10 to 1:2 |
| Weight (g) | 10 to 160 | 15 to 120 | 15 to 120 | 15 to 120 | 20 to 90 |
| Density (g/cm$^3$) | 1.2 to 2.0 | 1.4 to 1.9 | 1.4 to 1.9 | 1.5 to 1.8 | 1.5 to 1.8 |
| Water-dispersible carrier material | | | 20 to 90 | | |
| Active substances | | | 10 to 80 | | |

| | Body 51 | Body 52 | Body 53 | Body 54 | Body 55 |
|---|---|---|---|---|---|
| Ratio * | 1:20 to 4:5 | 1:20 to 4:5 | 1:15 to 2:3 | 1:15 to 2:3 | 1:10 to 1:2 |
| Weight (g) | 10 to 160 | 15 to 120 | 15 to 120 | 15 to 120 | 20 to 90 |
| Diameter (mm) ** | 3 to 20 | 4 to 18 | 4 to 18 | 5 to 15 | 5 to 15 |
| Water-dispersible carrier material | | | 20 to 90 | | |
| Active substances | | | 10 to 80 | | |
| Bearing surface | | | circular, planar | | |

| | Body 56 | Body 57 | Body 58 | Body 59 | Body 60 |
|---|---|---|---|---|---|
| Ratio * | 1:20 to 4:5 | 1:20 to 4:5 | 1:15 to 2:3 | 1:15 to 2:3 | 1:10 to 1:2 |
| Weight (g) | 10 to 160 | 15 to 120 | 15 to 120 | 15 to 120 | 20 to 90 |
| Density (g/cm$^3$) | 1.2 to 2.0 | 1.4 to 1.9 | 1.4 to 1.9 | 1.5 to 1.8 | 1.5 to 1.8 |
| Water-dispersible carrier material | | | 20 to 90 | | |
| Active substances | | | 10 to 80 | | |
| Bearing surface | | | circular, planar | | |

| | Body 61 | Body 62 | Body 63 | Body 64 | Body 65 |
|---|---|---|---|---|---|
| Ratio * | 1:20 to 4:5 | 1:20 to 4:5 | 1:15 to 2:3 | 1:15 to 2:3 | 1:10 to 1:2 |
| Weight (g) | 10 to 160 | 15 to 120 | 15 to 120 | 15 to 120 | 20 to 90 |
| Density (g/cm$^3$) | 1.2 to 2.0 | 1.4 to 1.9 | 1.4 to 1.9 | 1.5 to 1.8 | 1.5 to 1.8 |
| Water-dispersible carrier material | | | 20 to 90 | | |
| Active substances | | | 10 to 80 | | |
| Bearing surface | | | circular, planar | | |
| Cross-sectional area *** | | | circular | | |

| | Body 66 | Body 67 | Body 68 | Body 69 | Body 70 |
|---|---|---|---|---|---|
| Ratio * | 1:20 to 4:5 | 1:20 to 4:5 | 1:15 to 2:3 | 1:15 to 2:3 | 1:10 to 1:2 |
| Weight (g) | 10 to 160 | 15 to 120 | 15 to 120 | 15 to 120 | 20 to 90 |
| Diameter (mm) ** | 3 to 20 | 4 to 18 | 4 to 18 | 5 to 15 | 5 to 15 |
| Water-dispersible carrier material | | | 20 to 90 | | |
| Active substances | | | 10 to 80 | | |
| Bearing surface | | | circular, planar | | |
| Cross-sectional area *** | | | circular | | |

| | Body 71 | Body 72 | Body 73 | Body 74 | Body 75 |
|---|---|---|---|---|---|
| Ratio * | 1:20 to 4:5 | 1:20 to 4:5 | 1:15 to 2:3 | 1:15 to 2:3 | 1:10 to 1:2 |
| Weight (g) | 10 to 160 | 15 to 120 | 15 to 120 | 15 to 120 | 20 to 90 |
| Density (g/cm$^3$) | 1.2 to 2.0 | 1.4 to 1.9 | 1.4 to 1.9 | 1.5 to 1.8 | 1.5 to 1.8 |
| Water-dispersible carrier material | | | 20 to 90 | | |
| Active substances | | | 10 to 80 | | |
| Bearing surface | | | circular, planar | | |
| Cross-sectional area *** | | | circular | | |
| Cross-sectional area **** | | | arc of a circle | | |

| | Body 76 | Body 77 | Body 78 | Body 79 | Body 80 |
|---|---|---|---|---|---|
| Ratio * | 1:20 to 4:5 | 1:20 to 4:5 | 1:15 to 2:3 | 1:15 to 2:3 | 1:10 to 1:2 |
| Weight (g) | 10 to 160 | 15 to 120 | 15 to 120 | 15 to 120 | 20 to 90 |
| Diameter (mm) ** | 3 to 20 | 4 to 18 | 4 to 18 | 5 to 15 | 5 to 15 |
| Water-dispersible carrier material | | | 20 to 90 | | |
| Active substances | | | 10 to 80 | | |
| Bearing surface | | | circular, planar | | |
| Cross-sectional area *** | | | circular | | |
| Cross-sectional area **** | | | arc of a circle | | |

* ratio of the maximum diameter of the bearing surface to the maximum diameter of a cross-sectional area of the dome surface parallel to the bearing surface
** maximum diameter of the bearing surface
*** cross-sectional area parallel to the bearing surface
**** cross-sectional area orthogonal to the bearing surface To use the cleaning agent shaped bodies described above, said bodies are placed in the cistern of a toilet and the toilet is then flushed.

A method for cleaning or scenting the water in a toilet cistern, comprising the steps of:

a) introducing a cleaning agent shaped body according to one of points 1 to 19 into the water reservoir of a toilet cistern; and b) actuating the flush with at least partial replacement of the water reservoir in the toilet cistern is another subject of this application. The toilet cistern used in this method preferably has a flat base. In the context of this method, a single cleaning agent shaped body or a plurality of cleaning agent shaped bodies can be introduced into the water reservoir of the toilet cistern at the same time. However, it is preferred to introduce a single cleaning agent shaped body into the water reservoir, which body remains there for at least 40, preferably at least 80 and in particular at least 200, flushing cycles.

As already stated above in connection with the use according to the invention, the specific technical features disclosed above in connection with the cleaning agent shaped body also apply, mutatis mutandis, to the described method. To avoid repetition, reference is also made at this point to the statements made there.

Within the scope of this application, the following agents and methods are provided, inter alia:

1. A cleaning agent shaped body comprising a bearing surface and a dome surface adjoining the bearing surface, wherein the ratio of the maximum diameter of the bearing surface to the maximum diameter of a cross-sectional area of the dome surface parallel to the bearing surface is 1:20 to 4:5.
2. The cleaning agent shaped body according to point 1, wherein the bearing surface is planar.
3. The cleaning agent shaped body according to one of the preceding points, comprising a planar, circular bearing surface and a spherical dome surface adjoining this bearing surface, wherein the ratio of the maximum diameter of the bearing surface to the maximum diameter of a cross-sectional area of the dome surface parallel to the bearing surface is 1:20 to 4:5.
4. The cleaning agent shaped body according to one of the preceding points, wherein the bearing surface has imprints.
5. The cleaning agent shaped body according to one of the preceding points, wherein the bearing surface has planar and convex portions.
6. The cleaning agent shaped body according to one of the preceding points, wherein the bearing surface is completely convex.
7. The cleaning agent shaped body according to one of the preceding points, wherein the edge between the bearing surface and the dome surface extends in a wave-shaped manner.
8. The cleaning agent shaped body according to one of the preceding points, wherein the edge between the bearing surface and the dome surface is planar.
9. The cleaning agent shaped body according to one of the preceding points, wherein the dome surface has an apex.
10. The cleaning agent shaped body according to one of the preceding points, wherein the shaped body has, in parallel with the bearing surface, a circular or ellipsoidal cross-sectional area, preferably a circular cross-sectional area.
11. The cleaning agent shaped body according to one of the preceding points, wherein the shaped body has, orthogonally to the bearing surface, a cross section in the form of an arc of a circle or an arc of an ellipse, preferably in the form of an arc of a circle.
12. The cleaning agent shaped body according to one of the preceding points, wherein the shaped body has an axis of symmetry orthogonally to the bearing surface.
13. The cleaning agent shaped body according to one of the preceding points, wherein the shaped body has the shape of a spherical segment, wherein the ratio of the maximum diameter of the base area to the maximum diameter of a cross-sectional area of the dome parallel to the base area is 1:20 to 4:5.
14. The cleaning agent shaped body according to one of the preceding points, wherein the dome surface has imprints.
15. The cleaning agent shaped body according to one of the preceding points, wherein the ratio of the maximum diameter of the bearing surface to the maximum diameter of a cross-sectional area of the dome surface parallel to the bearing surface is 1:15 to 2:3, preferably 1:10 to 1:2.
16. The cleaning agent shaped body according to one of the preceding points, wherein the shaped body is suitable for remaining in the toilet cistern for at least 40, preferably at least 80 and in particular at least 200, flushing cycles.
17. The cleaning agent shaped body according to one of the preceding points, wherein the bearing surface has a maximum diameter of 3 to 20 mm, preferably 4 to 18 mm and in particular 5 to 15 mm.
18. The cleaning agent shaped body according to one of the preceding points, wherein the shaped body has a volume of 8 to 100 ml, preferably of 12 to 80 ml and in particular of 15 to 60 ml.

19. The cleaning agent shaped body according to one of the preceding points, wherein the shaped body has a weight of 10 to 160 g, preferably of 15 to 120 g and in particular of 20 to 90 g.
20. The cleaning agent shaped body according to one of the preceding points, wherein the shaped body has a density of 1.2 to 2.0 g/cm$^3$, particularly preferably of 1.4 to 1.9 g/cm$^3$ and in particular of 1.5 to 1.8 g/cm$^3$.
21. The cleaning agent shaped body according to one of the preceding points, comprising:
    a) 20 to 90 wt. % water-dispersible carrier material; and
    b) 10 to 80 wt. % active substances.
22. The cleaning agent shaped body according to one of the preceding points, wherein the shaped body comprises at least one active substance from the group of surfactants, fragrances and dyes.
23. The cleaning agent shaped body according to one of the preceding points, wherein the shaped body is single-phase.
24. The use of a cleaning agent shaped body according to one of the preceding points for cleaning or scenting the water in a toilet cistern.
25. The use according to the preceding point, wherein the shaped body remains in the toilet cistern for at least 40, preferably at least 80 and in particular at least 200, flushing cycles.
26. A method for cleaning or scenting the water in a toilet cistern, comprising the steps of:
    a) introducing a cleaning agent shaped body according to one of points 1 to 22 into the water reservoir of a toilet cistern; and
    b) actuating the flush with at least partial replacement of the water reservoir in the toilet cistern.
27. The method according to point 25, wherein the toilet cistern has a flat base.
28. The method according to one of the preceding points, wherein a single cleaning agent shaped body is introduced into the water reservoir of the toilet cistern and remains there for at least 40, preferably at least 80 and in particular at least 200, flushing cycles.

BRIEF DESCRIPTION OF THE DRAWINGS

The following figures illustrate embodiments of the present invention.

DETAILED DESCRIPTION OF THE INVENTION

Figure 1B:
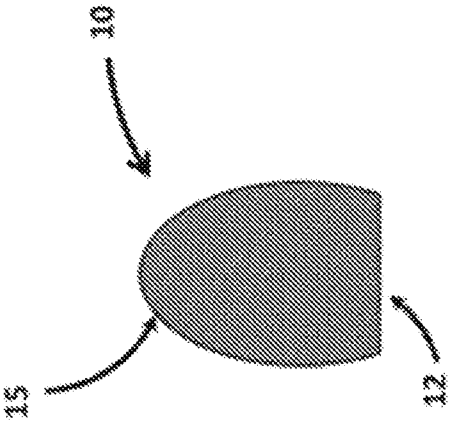
FIG. 1*b* cleaning agent shaped body, the cross-section of which extending orthogonally to the bearing surface has the shape of an arc of an ellipse.
Figure 1A:
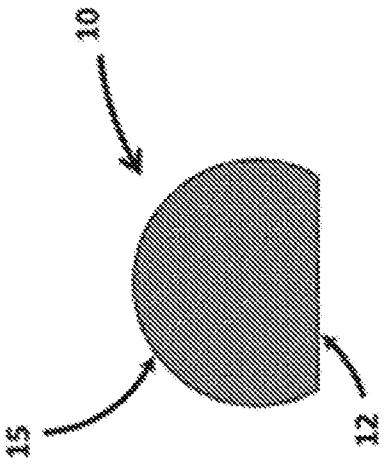
FIG. 1*a* cleaning agent shaped body, the cross section of which extending orthogonally to the bearing surface has the shape of an arc of a circle.

FIG. 1*a* shows a cleaning agent shaped body 10 according to the invention. The cleaning agent shaped body 10 has a bearing surface 12 and a dome surface 15. The dome surface is spherical.

FIG. 1*b* shows a cleaning agent shaped body 10 according to the invention. The cleaning agent shaped body 10 has a bearing surface 12 and a dome surface 15. The dome surface is ellipsoidal.

Figure 2:
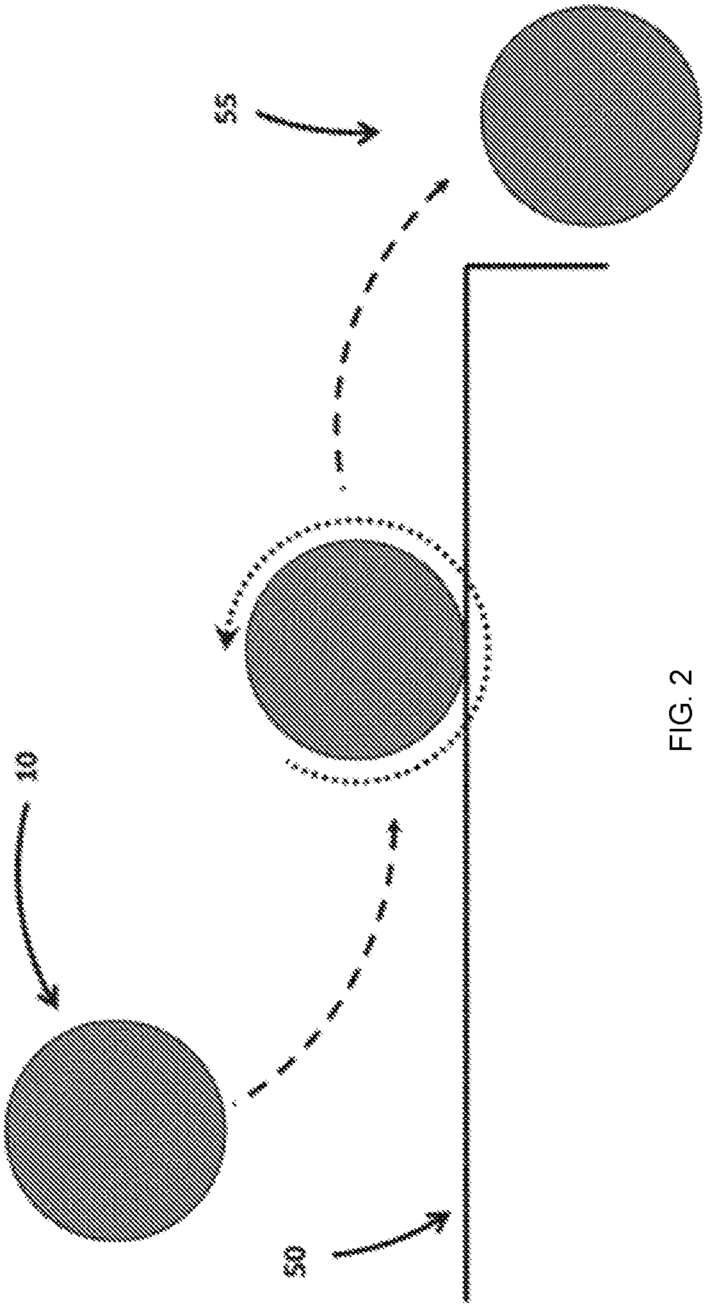
FIG. 2 use of a cleaning agent shaped body according to the prior art.

FIG. 2 shows the use of a cleaning agent shaped body 10 according to the prior art.

The cleaning agent shaped body 10 is designed as a sphere. The cleaning agent shaped body 10 has no bearing surface 12.

If the cleaning agent shaped body 10 is introduced into a toilet cistern, the cleaning agent shaped body 10 in the cistern can move in the water reservoir in the toilet cistern, but in particular on the base 50 of the toilet cistern. The cleaning agent shaped body 10 can be flushed out through the outlet 55 of the toilet cistern by this movement, for example a rolling movement.

Figure 3:
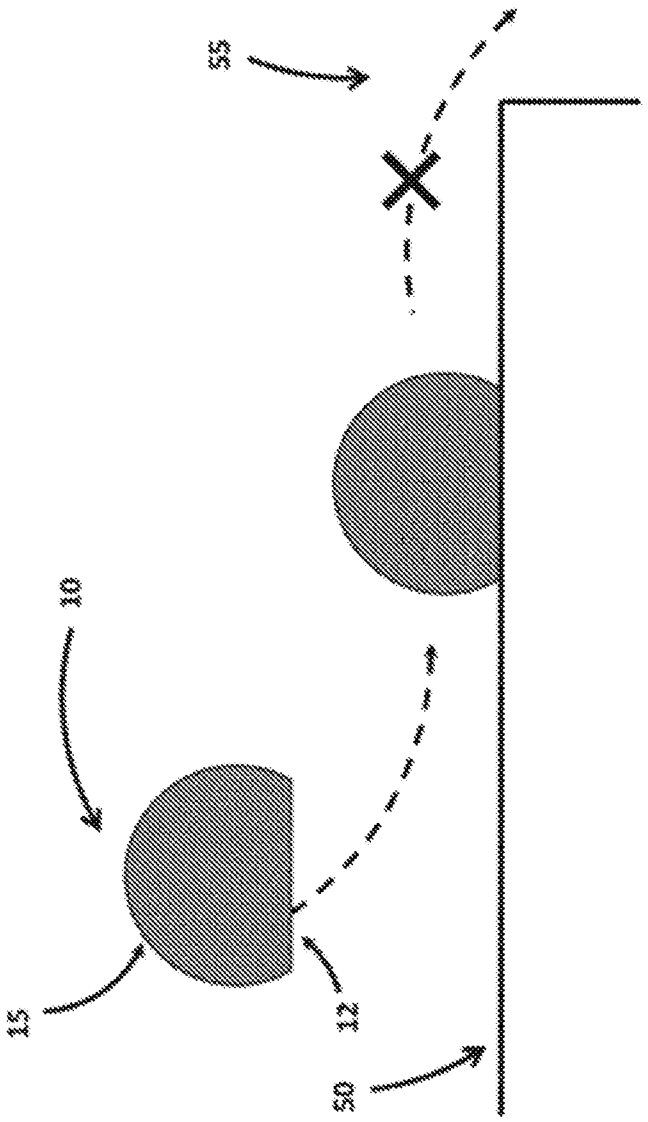
FIG. 3 use of a cleaning agent shaped body according to the invention.

FIG. 3 shows the use of a cleaning agent shaped body 10 according to the invention. The cleaning agent shaped body 10 has, in particular, a bearing surface 12.

Due to the cleaning agent shaped body 10 according to the invention having a bearing surface 12 in addition to a dome surface 15, the cleaning agent shaped body 10 can rest in the cistern so as to have the bearing surface 12 on the base 50 of the toilet cistern, without moving in the toilet cistern. Uneven rinsing behavior is prevented. Furthermore, the cleaning agent shaped body 10 is prevented from being flushed out of the cistern through the drain 55 of the toilet cistern by a rolling movement. It was also advantageously observed that the cleaning agent shaped body 10, if the bearing surface 12 thereof does not hit the base 50 after said body has been introduced into the water reservoir and has dropped down to the base 50 of the toilet cistern, moves, by rolling in the toilet cistern under the usual flow conditions, into a position in which the bearing surface 12 rests on the base. This rolling movement is promoted in particular by a design of the shaped body in which said body has, orthogonally to the bearing surface, a cross section in the form of an arc of a circle or an arc of an ellipse, preferably in the form of an arc of a circle.

Once the bearing surface 12 of the cleaning agent shaped body 10 is resting on the base 50, the cleaning agent shaped body 10 can no longer be flushed out of the cistern through the drain 55 by means of a rolling movement.

LIST OF REFERENCE SIGNS

10 Cleaning agent shaped body
12 Bearing surface
15 Dome surface
50 Toilet cistern base
55 Toilet cistern outlet

What is claimed is:

1. A cleaning agent body comprising:
a bearing surface that is entirely planar; and
a dome surface adjoining the bearing surface,
wherein the ratio of the maximum diameter of the bearing surface to the maximum diameter of a cross-sectional area of the dome surface parallel to the bearing surface is from 1:20 to 4:5.

2. The body of claim 1, wherein the dome surface has a spherical shape.

3. The body of claim 1, wherein the ratio of the maximum diameter of the bearing surface to the maximum diameter of the cross-sectional area of the dome surface parallel to the bearing surface is from 1:15 to 2:3.

4. The body of claim 1, wherein the body at least partially remains in a toilet cistern for at least 40 flushing cycles.

5. The body of claim 1, wherein the maximum diameter of the bearing surface is from 3 to 20 mm.

6. The body of claim 1, wherein the body has a weight of from 10 to 160 g.

7. The body of claim 1, wherein the body has a density of from 1.2 to 2.0 g/cm$^3$.

8. The body of claim 1, comprising:

20 to 90 wt. % water-dispersible carrier material, based on the total weight of the body; and 10 to 80 wt. % active substances, based on the total weight of the body.

9. A method for cleaning or scenting water in a toilet cistern, the method comprising:

introducing the body of claim 1 into the water of the toilet cistern; and actuating a flush cycle with at least partial replacement of the water in the toilet cistern.

10. The body of claim 3, wherein the ratio of the maximum diameter of the bearing surface to the maximum diameter of the cross-sectional area of the dome surface parallel to the bearing surface is from 1:10 to 1:2.

11. The body of claim 4, wherein the body at least partially remains in the toilet cistern for at least 80 flushing cycles.

12. The body of claim 11, wherein the body at least partially remains in the toilet cistern for at least 200 flushing cycles.

13. The body of claim 5, wherein the bearing surface has a maximum diameter of from 4 to 18 mm.

14. The body of claim 13, wherein the bearing surface has a maximum diameter of from 5 to 15 mm.

15. The body of claim 6, wherein the body has a weight of from 15 to 120 g.

16. The body of claim 7, wherein the body has a density of from 1.4 to 1.9 g/cm$^3$.

17. The body of claim 1, wherein the bearing surface defines at least one imprint.

18. The body of claim 1, wherein the dome surface has a convex polyhedral shape.

* * * * *